United States Patent Office 3,480,636
Patented Nov. 25, 1969

3,480,636
PROCESS FOR PREPARING α-NITROSULFONIC ACIDS
Bernard Loev, Broomall, Pa., assignor to Smith Kline & French Laboratories, Philadelphia, Pa., a corporation of Pennsylvania
No Drawing. Filed Sept. 29, 1966, Ser. No. 583,067
Int. Cl. C07c *143/08, 143/06, 143/20*
U.S. Cl. 260—293.4
3 Claims

ABSTRACT OF THE DISCLOSURE

A process for preparing α-nitrosulfonic acids by reacting an α-halo-α-nitro compound with an alkaline sulfurous acid solution and acidifying the resulting α-nitrosulfonic acid salt α-nitrosulfonic acids prepared by this process are useful as wetting agents, detergents, emulsifying agents and blowing agents, in the treatment of rubber, leather, paper and oil and as intermediates, insecticides, herbicides, antibacterials, coccidiostats and anthelmintics.

---

This invention relates to a new process for preparing α-nitrosulfonic acids.

The new process of this invention is advantageous because the procedure is simple and rapid and the process is of general applicability. It may be used in the preparation of α-nitro derivitives of aliphatic, aromatic and heterocyclic sulfonic acids.

The process of this invention is defined as follows:

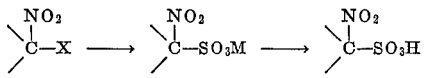

in which X is halogen and M is alkali metal or ammonium.

According to this process an α-halo-α-nitro compound is reacted with an alkaline sulfurous acid solution to give an α-nitrosulfonic acid salt. The alkaline sulfurous acid solution is prepared by dissolving a sulfite salt such as an alkali metal or ammonium sulfite, for example, preferably sodium sulfite, in a suitable solvent, for example, water or a lower alkanol or alternatively, by passing sulfur dioxide into an alkaline solution such as an alkali metal hydroxide or ammonium hydroxide in water or a lower alkanol, preferably sodium hydroxide in water. Optionally, a mixture of solvents for example a lower alkanol, such as methanol, and water or acetone and water may be used. The temperature at which the reaction is carried out is not critical, generally it will be carried out at about room temperature to about 150° C. The reaction is preferably run for about 2–24 hours.

The resulting α-nitrosulfonic acid salt is acidified, for example by treating a solution of the salt in a suitable solvent for example a lower alkanol, such as methanol, with gaseous hydrogen chloride to give the α-nitrosulfonic acid. Alternatively, a solution of the α-nitro sulfonic acid salt in a suitable solvent, for example a lower alkanol, such as methanol, is passed through an acid ion exchange resin to give the α-nitrosulfonic acid.

More specifically, the process of this invention is defined as follows:

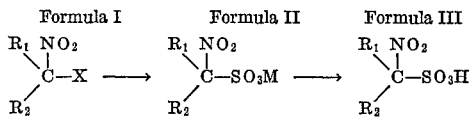

in which $R_1$ and $R_2$ are hydrogen, alkyl, cycloalkyl, alkenyl, cycloalkenyl, alkynyl, aryl, aralkyl, heterocyclic, heterocyclic-alkyl, alkanoyl, aroyl or, when taken together, form a carbocyclic or heterocyclic ring and M is alkali metal or ammonium, preferably, M is sodium.

The term "heterocyclic" as used hereabove denotes preferably nitrogen, oxygen or sulfur heterocycles.

The process of this invention provides an advatageous method for preparing α-nitrosulfonic acids which are useful as wetting agents, detergents, emulsifying agents and blowing agents. These compounds are also useful in the treatment of rubber, leather, paper and oil and as intermediates, insecticides, herbicides, antibacterials, coccidiostats and anthelmintics.

In addition, the α-nitrosulfonic acids of Formula III and the α-nitrosulfonic acid salts of Formula II are useful as intermediates in the preparation of corresponding α-nitro- and α-aminosulfonamides. The α-nitrosulfonic acids or salts thereof are converted to the α-nitrosulfonic acid chlorides by treating with a chlorinating agent. Reacting the α-nitrosulfonic acid chlorides with amines gives the α-nitrosulfonamides. The α-nitro group is reduced, for example, by catalytic hydrogenation or electrolytic reduction to give the α-aminosulfonamides. This reduction proceeds through an α-nitrososulfonamide intermediate; where at least one of $R_1$ and $R_2$ is hydrogen, this intermediate can exist in equilibrium with an α-oximidosulfonamide. These intermediates are further reduced, for example, by catalytic hydrogenation or electrolytic reduction or chemically, to give the α-aminosulfonamides. The α-aminosulfonamide products have biological properties and in addition are intermediates for dyestuffs.

The following examples are not limiting but are illustrative of the process of this invention. Various changes and modifications may be made in carrying out the process of this invention without departing from the spirit and scope thereof. Insofar as these changes and modifications are within the purview of the appended claims they are considered as part of this invention.

EXAMPLE 1

1-chloro-1-nitroethane (60 g.) in 120 ml. of methanol is added to 69 g. of sodium sulfite in 225 ml. of water. The resulting mixture is heated at reflux for 24 hours, then concentrated to dryness. The residue is extracted with hot methanol; the extracts are concentrated to dryness to give sodium α-nitroethanesulfonate.

Hydrogen chloride is bubbled into a solution of sodium α-nitroethanesulfonate in methanol. Filtering, then concentrating the filtrate to dryness gives, as the residue, α-nitroethanesulfonic acid.

EXAMPLE 2

By the procedure of Example 1 using 67 g. of 2-chloro-2-nitropropane, the product is α-methyl-α-nitroethanesulfonic acid.

EXAMPLE 3

By the procedure of Example 1 using equimolar amounts of 2-bromo-2-nitrooctane and sodium sulfite, the product is α-methyl-α-nitroheptanesulfonic acid.

EXAMPLE 4

Chloronitromethane (9.5 g.) in 50 ml. of methanol is added to 11.6 g. of ammonium sulfite in 60 ml. of water and the resulting mixture is heated at reflux for 10 hours. After working up as in Example 1, ammonium nitromethanesulfonate is obtained.

Treating the above prepared salt in methanol with hydrogen chloride by the procedure of Example 1 gives nitromethanesulfonic acid.

EXAMPLE 5

Chlorine gas is passed into a solution of α-nitrotoluene in dilute aqueous sodium hydroxide solution at room temperature for 25 minutes. The oil that separates is α-chloro-α-nitrotoluene.

A mixture of 20 g. of α-chloro-α-nitrotoluene and 16.5 g. of sodium sulfite in 250 ml. of methanol is heated at reflux for 24 hours. Concentrating to dryness, extracting the residue with hot methanol and concentrating the extracts gives sodium α-nitro-α-toluenesulfonate.

Bubbling hydrogen chloride into a mixture of sodium α-toluenesulfonate in methanol, then filtering and concentrating the filtrate gives, as the residue, α-nitro-α-toluenesulfonic acid.

EXAMPLE 6

By the procedure of Example 5 using diphenylnitromethane, sodium α-nitro-α-toluenesulfonate is prepared.

A solution of sodium α-nitro-α-phenyl-α-toluenesulfonate in methanol is passed through a strong acid ion exchange resin. The eluate is collected and concentrated to give, as the residue, α-nitro-α-phenyl-α-toluenesulfonic acid.

EXAMPLE 7

By the procedure of Example 5, 2-chloronitromethylpyridine is prepared from 2-nitromethylpyridine.

A mixture of 17.2 g. of 2-chloronitromethylpyridine and 16.6 g. of sodium sulfite in 200 ml. of acetone and 100 ml. of water is heated at reflux for 16 hours. Working up by concentrating, extracting with hot methanol and concentrating the extracts gives sodium α-nitro-α-(2-pyridyl)-methanesulfonate.

Passing hydrogen chloride into a methanol solution of the above prepared salt, then filtering and concentrating the filtrate gives, as the residue, α-nitro-α-(2-pyridyl)-methanesulfonic acid.

EXAMPLE 8

By the procedure of Example 5 the following nitro compounds are converted to the corresponding chloronitro compounds:

2-(2-nitroethyl)thiophene
2-(2-nitroethyl)furan
3-(2-nitroethyl)indole
p-(2-nitropropyl)toluene
1-(2-nitroethyl)piperidine The above prepared chloronitro compounds in methanol are mixed with aqueous sodium sulfite. The resulting mixtures are heated at reflux for 24 hours, then worked up as in Example 1 to give the sodium salts of the sulfonic acids which on treatment with hydrogen chloride in methanol and working up as in Example 1 give the following α-nitrosulfonic acids, respectively:

α-Nitro-α-(2-thenyl)methanesulfonic acid
α-Furfuryl-α-nitromethanesulfonic acid
β-(3-indolyl)-α-nitroethanesulfonic acid
α-Methyl-α-nitro-β-(p-tolyl)ethanesulfonic acid
α-Nitro-β-(1-piperidyl)ethanesulfonic acid

EXAMPLE 9

The following nitro compounds are converted to the corresponding chloronitro compounds by the procedure of Example 5:

nitromethylcyclohexane
nitromethyl-1-cyclohexene
nitro-2-propanone
1-nitro-2-butanone
2-nitroacetophenone
3-nitropropene
1-nitro-2-butene
1-nitrononane
2-(α-nitrobenzyl)tetrahydropyran From the above prepared chloronitro compounds the following products, respectively, are prepared by the procedure of Example 1:

α-Cyclohexyl-α-nitromethanesulfonic acid
α-(1-cyclohexyl)-α-nitromethanesulfonic acid
α-Acetyl-α-nitromethanesulfonic acid
α-Nitro-α-propionylmethanesulfonic acid
α-Benzoyl-α-nitromethanesulfonic acid
1-nitro-2-propenesulfonic acid
1-nitro-2-butenesulfonic acid
1-nitrononanesulfonic acid
α-Nitro-α-tetrahydropyranyl-α-toluenesulfonic acid

EXAMPLE 10

By the procedure of Example 5 the following nitro compounds are converted to the corresponding chloronitro compounds:

nitrocyclopentane
3-nitrocyclohexene

The following products are prepared, respectively, from the above prepared chloronitro compounds by the procedure of Example 1:

1-nitrocyclopentanesulfonic acid
3-nitro-3-cyclohexenesulfonic acid

EXAMPLE 11

A solution of 1-chloro-7-tetradecyne in dimethyl-sulfoxide is stirred for four hours at room temperature with sodium nitrite. The mixture is then diluted with water and extracted with hexane. The hexane extracts are concentrated and distilled in vacuo to give 1-nitro-7-tetradecyne.

The nitro compound is dissolved in dilute aqueous sodium hydroxide solution and chlorine is bubbled in until separation of oil ceases. The mixture is extracted with ether and the ether is removed from the extracts in vacuo to give 1-nitro-1-chloro-7-tetradecyne which is converted to the potassium sulfonate by stirring with aqueous potassium sulfite at room temperature for 24 hours and working up as in Example 1.

Treating the above prepared potassium 1-nitro-7-tetradecynesulfonate in methanol with hydrogen chloride by the procedure of Example 1 gives 1-nitro-7-tetradecynesulfonic acid.

EXAMPLE 12

4-chloro-1-methylpiperidine is reacted with sodium nitrite in dimethylsulfoxide by the procedure of Example 11 and the resulting 4-chloro-1-methyl-4-nitropiperidine is dissolved in dilute sodium hydroxide solution. One equivalent of chlorine is bubbled into the resulting solution, while cooling. The solution is treated with sufficient dilute aqueous sodium hydroxide solution to give a solution with pH about 7.5, then it is extracted with ether. The ether is removed from the extracts in vacuo to give 4-chloro-1-methyl-4-nitropiperidine.

A solution of 10% aqueous sodium hydroxide solution is saturated with sulfur dioxide and to the resulting solution is added 4-chloro-1-methyl-4-nitropiperidine in ethanol. The resulting mixture is stirred at about 60° C. for ten hours. After working up by the procedure of Example 1, sodium 1-methyl-4-nitro-4-piperidinesulfonate is obtained.

A methanol solution of the above prepared sulfonate salt is treated with hydrogen chloride by the procedure of Example 1 to give 1-methyl-4-nitro-4-piperidinesulfonic acid.

Similarly using 3-chlorotetrahydrofuran and 4-bromotetrahydrothiapyran instead of 4-chloro-1-methylpiperidine in the above procedure, the products are 3-nitro-3-tetrahydrofuransulfonic acid and 4-nitro-4-tetrahydrothiapyransulfonic acid, respectively.

What is claimed is:

1. A process of preparing α-nitrosulfonic acids of the formula:

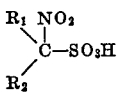

in which $R_1$ and $R_2$ are hydrogen, alkyl, cycloalkyl, alkenyl, cycloalkenyl, alkynyl, aryl, aralkyl, heterocyclic, heterocyclic-alkyl, alkanoyl, aroyl or, when taken together, form a carbocyclic or heterocyclic ring which comprises treating a compound of the formula:

in which $R_1$ and $R_2$ are as defined above and X is halogen with an alkaline sulfurous acid solution and acidifying.

2. The process of claim 1 in which the alkaline sulfurous acid solution is aqueous sodium sulfite.

3. The process of preparing α-nitrosulfonic acid salts of the formula:

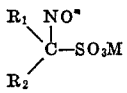

in which $R_1$ and $R_2$ are hydrogen, alkyl, cycloalkyl, alkenyl, cycloalkenyl, alknyl, aryl, aralkyl, heterocyclic, heterocyclic-alkyl, alkanoyl, aroyl or, when taken together, form a carbocyclic or heterocyclic ring and M is alkali metal or ammonium which comprises treating a compound of the formula.

in which $R_1$ and $R_2$ are as defined above and X is halogen with a solution containing a member selected from the group consisting of an alkali metal sulfite and ammonium sulfite.

References Cited

UNITED STATES PATENTS 2,820,818   1/1958   Sexton et al.

FOREIGN PATENTS 655,377   1/1963   Canada.

OTHER REFERENCES

Chemistry or Organic Cmds, Carl R. Noller, 1951, p. 272.

Synthetic Organic Chemistry, Wagner & Zook, 5th printing, 1953, p. 813.

J. Org. Chem. vol. 5, 1940, Latimer et al., pp. 24–28.

Ind. & Eng. Chem., vol. 46, No 9, 1954, Gilbert et al., pp. 1895–1897.

HENRY R. JILES, Primary Examiner

S. D. WINTERS, Assistant Examiner

U.S. Cl. X.R.

260—290, 293, 294.8, 295.5, 319.1, 326.12, 329, 332.5, 345.1, 346.1, 347.2, 503, 505, 511, 513, 543, 556, 644, 646, 999